United States Patent [19]

Fukuta

[11] 4,358,023
[45] Nov. 9, 1982

[54] CAPPING ASSEMBLY FOR USE IN FUEL STORAGE TANK FOR VEHICLES

[75] Inventor: Masakazu Fukuta, Tsushima, Japan

[73] Assignee: Kabushiki Kaisha Tokai Rika Denki Seisakusho, Aichi, Japan

[21] Appl. No.: 154,081

[22] Filed: May 28, 1980

[30] Foreign Application Priority Data

Jun. 1, 1979 [JP] Japan .............................. 54-75004[U]

[51] Int. Cl.³ ............................................ B65D 51/16
[52] U.S. Cl. ................................... 220/209; 137/508;
220/303; 220/304; 220/DIG. 33
[58] Field of Search ............... 220/202, 203, 209, 303, 220/304, DIG. 33; 137/508

[56] References Cited

U.S. PATENT DOCUMENTS

| 1,462,228 | 7/1923 | Croce et al. ............... 220/303 X |
| 3,061,138 | 10/1962 | Edelmann et al. .......... 137/508 X |
| 3,568,710 | 3/1971 | Boyer et al. ................ 137/508 X |
| 3,831,801 | 8/1974 | Rodgers ..................... 137/493 X |
| 3,891,114 | 6/1975 | Gerdes ............................ 220/209 |
| 3,937,358 | 2/1976 | Smith et al. ................ 220/303 X |
| 4,051,975 | 10/1977 | Ohsida et al. .................... 220/203 |
| 4,237,923 | 12/1980 | Pressaco ...................... 137/508 X |

FOREIGN PATENT DOCUMENTS

| 803799 | 4/1951 | Fed. Rep. of Germany ...... 220/203 |
| 1013979 | 8/1957 | Fed. Rep. of Germany ...... 220/203 |
| 2243382 | 4/1975 | France ............................. 137/508 |

Primary Examiner—Allan N. Shoap
Attorney, Agent, or Firm—Wenderoth, Lind & Ponack

[57] ABSTRACT

A capping assembly for use in a fuel storage tank provided for a motor vehicle and the like includes a diaphragm positioned inside the assembly so as to divide an internal space into two spaces. One space communicates with the inside of the tank and is separated from the other space which communicates with the outside of the tank. The assembly further includes a valve arrangement, comprising a needle valve and a valve seat, which cooperates with the diaphragm so that the two spaces can be selectively communicated with each other in response to a relative change of pressure inside the tank with respect to a predetermined pressure.

10 Claims, 4 Drawing Figures

CAPPING ASSEMBLY FOR USE IN FUEL STORAGE TANK FOR VEHICLES

BACKGROUND OF THE INVENTION

This invention relates to an assembly for capping a fuel inlet portion of a fuel storage tank provided for a motor vehicle or the like and more particularly, to a type of capping assembly that is provided with a valve arrangement, which is capable of controlling the pressure inside the fuel storage tank regardless of variations in that pressure.

Presently, there have been proposed a number of capping assemblies for use in fuel storage tanks, each being specifically arranged to cope with a specific problem wherein when a flow rate of the fuel from the tank is decreased, either when the amount of the fuel in the tank is considerably decreased or, when a comparatively large difference in temperature between the inside of the tank and the outside of the tank is present. According to such conventional assembles as described above, an internal passage is formed inside the assembly and a valve arrangement is conventionally incorporated into the internal passage in a manner such that when the pressure inside the tank is lowered to a predetermined pressure below the atmospheric pressure, the valve arrangement is correspondingly opened so as to permit air having the atmospheric pressure to flow into the inside of the tank. More specifically, referring now to FIG. 1, there is shown a typical capping assembly of the above-described conventional type, which is mounted on a fuel inlet portion of a fuel storage tank 11. The assembly comprises a cover 1, a casing 2, and a valve arrangement 3, and the valve arrangement 3 including a valve 6, a coil spring 10 and a disc member 8 is incorporated in the casing 2. The casing 2 is provided with an aperture 4 at the central bottom portion thereof, while the circumferential portion of the aperture 4 is backed by a sheet member 5 of rubber material. The valve 6 is arranged to be generally accommodated inside the casing 2, while a rod portion 7 is extended through the aperture 4. A substantially W-shaped disc member 8 is securely mounted on an end of the rod portion 7 in a manner such that an outermost circumferential portion of the disc member 8 can selectively contact the sheet member 5 in association with a vertical movement of the valve. A flange 9 is mounted on the top end of the rod portion 7. Furthermore, the coil spring 10, of the compression type, is positioned between the flange portion 9 and the portion defining the outer periphery of the aperture 4, and the rod portion 7 is enclosed by the coil spring 10. Accordingly, as long as an external force is not applied onto the valve arrangement 3, the outermost circumferential portion of the disc member 8 is in contact with the sheet member 5 by the spring force of the coil spring 10, and thus, the inside of the fuel storage tank is shut off from the atmosphere. On the other hand, when the pressure inside the fuel storage tank 11 is lowered to a predetermined pressure below the atmospheric pressure, the disc member 8 is drawn toward the inside of the tank. Such being the case and since air of atmospheric pressure is introduced, through a clearance provided between the cover 1 and the casing 2 and between the sheet member 5 and the outermost circumferential portion of the disc member 8 to the inside of the tank, the pressure inside the tank is raised, to atmospheric. Thus, the pressure inside the tank can be maintained at a predetermined pressure level according to the conventional assembly.

However, the conventional assembly of the above-described type has the following defects. One of the defects can be referred to an arrangement in which the outermost circumferential portion of the disc member 8 is normally urged toward the sheet member 5. Namely, the assembly can not have the advantage of rendering a high sealing capability, since the sealing area between the outermost circumferential portion of the disc member 8 and the sheet member 5 is comparatively large relative to the total force exerted by the coil spring. Namely, according to the capping assembly of the pressure controlling type, the valve arrangement is required to respond to a change of pressure inside the tank in quite a sensitive manner. Therefore, with such a valve arrangement as shown in FIG. 1, either the coil spring having a relatively small spring force must be used in the arrangement, or the circumferential portion of the disc member has to be made comparatively large. However, if the valve arrangement is arranged to satisfy the latter condition, the sealing pressure per unit sealing area is correspondingly decreased, and thus, the resultant assembly can not in turn have the advantage of having a high sealing capability. Furthermore, the outermost circumferential portion of the disc member 8 requires a precise finish so that an excellent sealing condition between the disc member 8 and the sheet portion 5 can be expected. In addition, another defect is related to the fact that the outermost circumferential portion of the disc member 8 tends to adhere to the surface of the sheet member 5, since the sheet member 5 is conventionally made of a rather sticky rubber. Such being the case, even if the pressure inside the tank 11 is negative relative to the predetermined pressure, the outermost circumferential portion will still remain in a state adhering to the surface of the sheet member 5 as described above, and thus, the valve arrangement 3 can not function properly.

SUMMARY OF THE INVENTION

Accordingly, an essential object of the present invention is to provide a capping assembly for use in fuel storage tanks which is arranged to overcome all the disadvantages inherent in the prior art as specifically described in the foregoing.

Another important object of the present invention is to provide a capping assembly of the above-described type which is compact and adaptable for use in any type of fuel inlet portion of fuel storage tank.

A further object of the present invention is to provide a capping assembly of the above-described type which is simple in construction and highly efficient in use.

A still further object of the present invention is to provide a capping assembly of the above-described type which can be manufactured at low cost.

In accomplishing these and other objects according to one preferred embodiment of the present invention, there is provided a capping assembly for capping a fuel inlet portion of a fuel storage tank for vehicles as will be described hereinbelow. A capping assembly is assembled with a hat-like shaped casing and a cover having a circular cross section, which comprises a diaphragm fixedly positioned inside the capping assembly in a manner such that an internal space inside the assembly may be divided into two spaces, with one space communicating with an inside of the tank and being separated the other space which communicates with the outside of the tank; a cylindrically shaped valve seat holding member having a valve seat at a bottom portion thereof, and having an upper portion thereat which is securedly coupled to a central aperture provided in the diaphragm; a needle valve, which is accommodated inside an internal cylindrical space of the valve seat holding member such that a conical tip end of the needle valve is in cooperation with the valve seat; and a spring means for substantially upwardly urging the valve seat holding member so that an opening provided in the valve seat is normally urged toward the conical tip end of the needle valve by the spring force, and thus, the opening is closed by the conical tip end of the needle valve. More specifically, when the pressure inside the fuel storage tank remains above a predetermined pressure and below the atmosphere pressure, the valve seat is arranged to be in contact with the conical free end portion of the needle valve so that a passage communicating the inside of the fuel storage tank with the outside of the fuel storage tank is interrupted. On the other hand, when the pressure inside the fuel storage tank becomes to lower than the predetermined pressure described above, a valve arrangement, including for example, the needle valve and the valve seat, is arranged to be in an open mode as follows. Namely, a portion of the diaphragm together with the valve seat holding member is drawn toward the inside of the fuel storage tank against the resilient spring force of the spring member whereby the valve seat holding member is displaced toward the inside of the tank. Such being the case, the valve seat is accordingly out of contact with the periphery of the conical tip end of the needle valve, which was in contact with the valve seat, and thus, the valve arrangement is open. The air can now be introduced into the inside of the fuel storage tank and the pressure inside the tank can also become normalized.

According to the present valve arrangement, since the valve arrangement is composed of the needle valve and the valve seat, the sealing area required for the valve arrangement is comparatively small relative to those required for the conventional valve arrangements. Therefore, the valve arrangement of the present invention has the advantage of rendering quite an effective seal. More specifically, depending upon the arrangement described above, an urging force, caused by the spring member and required for sealing the needle valve with the valve seat, can be made comparatively small, and yet the valve arrangement can respond to a slight and negative change of pressure with respect to the predetermined pressure in quite a sensitive manner. In addition according to the present invention, since the release of the seal is substantially performed by a functional characteristic of the diaphragm which can be made to have a comparatively large area without encountering the difficulty as previously described in connection with conventional capping assemblies, the valve arrangement is further arranged to readily respond to even a slight and negative change of the pressure with respect to the predetermined pressure.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted here that like parts are designated by like reference numerals throughout the several views of the accompanying drawings.

DETAILED DESCRIPTION OF THE INVENTION

Figure 1:
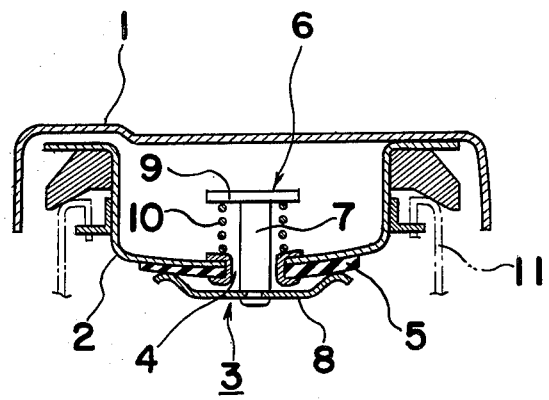
FIG. 1 is a side sectional view of a conventional capping assembly for use in fuel storage tanks according to the prior art.
Figure 2:
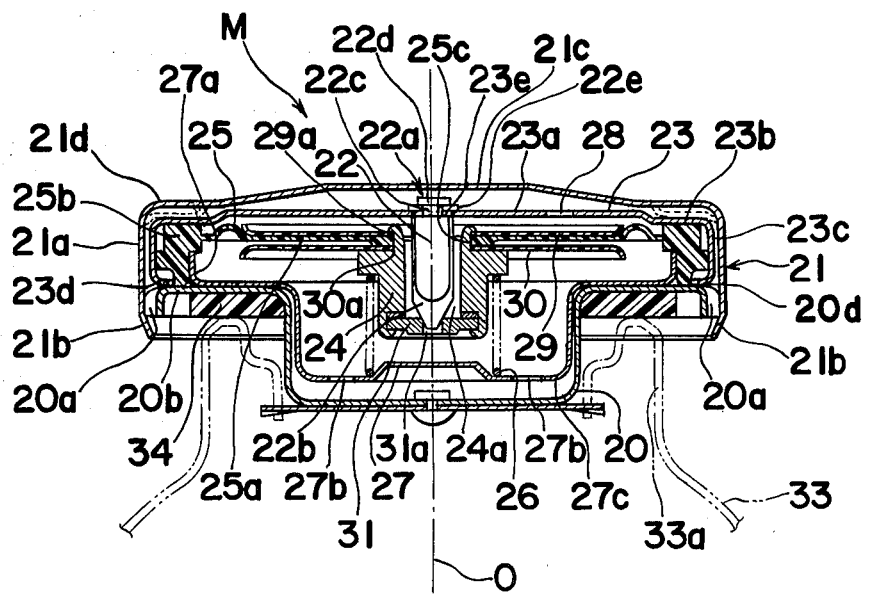
FIG. 2 is a schematic side sectional view of a capping assembly according to the present invention for use with a fuel storage tank.
Figure 3:
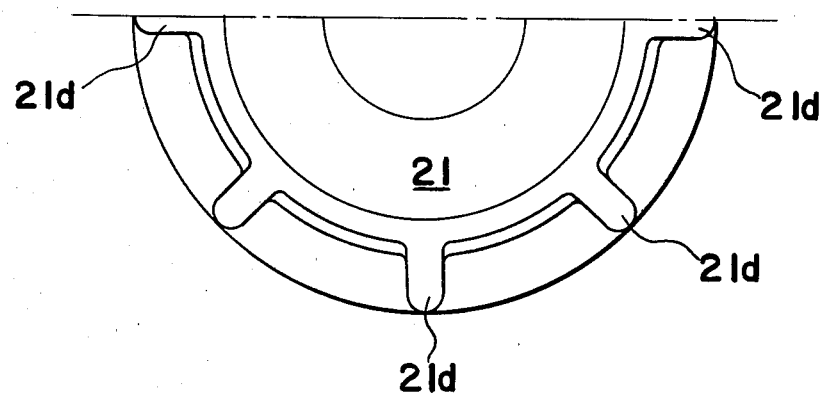
FIG. 3 is a partial top plan view of the capping assembly shown in FIG. 2.
Figure 4:
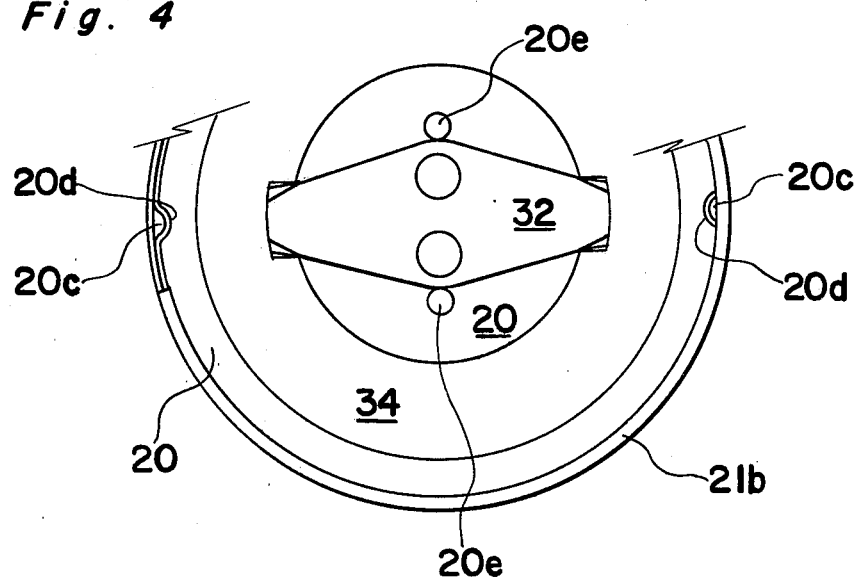
FIG. 4 is a partial bottom plan view of the capping assembly shown in FIG. 2.

Referring now to FIGS. 2 to 4, there is shown a capping assembly M of the present invention, which is mounted on a fuel inlet portion 33a of a fuel storage tank 33 provided for a motor vehicle or the like. The capping assembly M is assembled with a hat-like shaped casing 20 and a cover 21, having a circularly shaped cross section and which comprises a needle valve supporting member 23 for supporting a needle valve 22 at a central portion thereof, a diaphragm 25 to which a valve seat holding member 24 is fixed, a coil spring 26 of the compression type, and a coil spring supporting member 27.

The needle valve supporting member 23 is provided for the assembly M so that the needle valve 22, having a square-shaped cross section except for its tip portion, can be positioned at a predetermined position inside the capping assembly M. For this purpose, the needle valve supporting member 23 is provided with a central aperture 23e on which a base portion 22a of the needle valve 22 is rested. In addition to the central aperture 23e, an aperture 28 which functions as an air passage is further provided at a predetermined position within the needle valve supporting member 23. More specifically, the base portion 22a of the needle valve 22 includes a flange portion 22d, and a neck portion 22c interconnecting the flange portion 22d with a body portion of the needle valve 22. The circularly shaped flange portion 22d has a diameter slightly smaller than that of the central aperture 23e, and the cross sectional diameter of the interconnecting member 22c is much smaller than aperture 23e. When the needle valve 22 is assembled in the supporting member 23, both the flange portion 22d and the interconnecting neck portion 22c are firstly inserted into the central aperture 23e, and then, a U-shaped ring 22e is interposed between the flange portion 22d and the needle valve supporting member 23 thereby to making the flange portion 22d rest or abut the aperture 23e. By the arrangement as described above, the needle valve 22 is freely movable in any radial direction of the aperture 23e by a distance, which corresponds to the difference between the diameter of the interconnecting portion 22c and the diameter of central aperture 23e. The needle valve 22 is arranged to be supported by the needle valve supporting member 23 in a manner such that the longitudinal axis of the needle valve 22 coincides with the center line O of the capping assembly M. The needle valve supporting member 23 is connected with the respective cover 21 and the casing 20. A substantially lower portion of a circumferential side portion 21a of the cover 21 is inwardly folded so as to form a folded edge portion 21b. The folded edge portion 21b is arranged for supporting a circumferential side portion 20a of the casing. On the other hand, as specifically shown in FIG. 3, an outermost portion of the periphery of the substantially upper surface 21c of the cover 21 which defines a circumferential portion which axially inwardly recedes from the remaining upper surface and is substantially inwardly corrugated at certain areas circumferentially spaced on the cover 21 so as to form respective corrugated portions 21d on the cover 21. As can be seen in FIG. 2, both an outermost portion 23b, which axially inwardly recedes from an upper flat surface 23a of the needle valve supporting member 23, and a substantially lower portion 23d of a circumferential side portion 23c of the needle valve supporting member 23 are tightly held between respective corrugated portions 21d and an outermost portion 20b of an upper portion of the casing 20.

The diaphragm 25 comprises a film-like portion 25a, and an outermost circumferential portion 25b having a wide axial cross sectional dimension. The outermost circumferential portion 25b is arranged to be tightly enclosed by the outermost portion 20b of the upper portion of the casing 20 and the outermost portion 23b, which axially recedes from the upper flat surface 23a of the needle valve supporting member 23. Accordingly, the outermost circumferential portion 25b divides the space between the outermost portion 20b and the outermost portion 23b into two chambers or portions, and communication between these two chambers is completely cut off by the portion 25b. The diaphragm 25 is provided with a central aperture or opening 25c at the center of the film-like portion 25a, and the location of the central aperture 25c is arranged to coincide with that of the needle valve 22. On both the upper and lower surfaces of the diaphragm 25, there are respectively provided a pair of diaphragm covering members 29 and 30, each having a central aperture 29a or 30a whose location is arranged to coincide with that of the central aperture 25c when these three members or means are assembled in one unit. An upper portion of the valve seat holding member 24 is extended through these apertures and arranged to be radially inwardly coupled to these three apertures, thus the upper portion of the valve sheet holding member 24 being securedly fixed.

The valve seat holding member 24 has a substantially cylindrical configuration. A lower end portion, which is located axially relative to the upper portion described above, remains in a free condition, wherein an annular valve seat 31 is fixedly coupled to the inside wall of a through bore 24a in the lower end portion of member 24. The bulk portion of the needle valve 22 is accommodated inside the through bore 24a of the valve seat holding member 24, while the conical tip end 22b (i.e., a sealing end portion) is inserted into a through bore 31a of the annular valve seat 31. Accordingly, a sealing is performed by the periphery of the conical free end 22b of the needle valve 22 in cooperation with the inner periphery of the through bore 31a. The needle valve 22 is capable of being relatively axially slidably movable, with the bulk portion thereof having the square cross section and being slidably accommodated within the through bore 24a.

The coil spring supporting member 27 has a substantially W-shaped axial cross section, as shown in FIG. 2, and is disposed in a manner such that the coil spring supporting member 27 substantially overlaps the casing 20. Furthermore, the substantially uppermost side circumference 27a of the coil spring supporting member 27 is arranged to be definitely bounded by an inner circumferential surface of the outermost circumferential portion 25b of the diaphragm 25. Thus, the coil spring supporting member 27 is disposed in a predetermined manner inside the capping assembly M. Due to the reason as described hereinafter, the coil spring supporting member 27 is provided with a plurality of openings or holes 27b on the bottom portion 27c thereof which function as air passages.

The coil spring 26, of the compression type, is disposed between the coil spring supporting member 27 and an upper lid portion of the valve seat holding member 24 in a manner such that both the valve seat holding member 24, including the annular seat 31, and the diaphragm 25 are normally urged toward the needle valve 22. Thus, by the arrangement as described above, the conical free end 22b of the needle valve 22 is forcibly accommodated inside the bore 31a of the annual seat 31 under a normal condition of the capping assembly M, whereby the needle valve 22 remains closed as specifically shown in FIG. 2.

As can be seen in FIGS. 2 and 4, the outermost circumferential side 20a of the casing 20 is provided with a plurality of radially inward projecting portions 20d. Therefore, a number of air passages 20c are formed between the inner surface of a circumferential side 21a of the cover 21 and the portions 20d when the cover 21 and the casing 20 are assembled as one unit. Furthermore, a plurality of air passages 20e are provided in the substantially bottom portion of the casing 20, while an engaging member 32 is secured to a rear surface of the bottom of the casing 20. The capping assembly M is attached to the inlet portion 33a of the fuel storage tank 33 with the help of the engaging member 32. A gasket 34 is securedly attached to the outer boundary of the casing 20 and is in contact with an upper edge of the inlet portion 33a of the fuel storage tank 33 when the capping assembly M of the present invention is attached to the fuel storage tank 33.

According to the capping assembly M of the present invention, an air passage capable of communicating the outside of the tank with the inside of the tank is established as descried hereinbelow when the capping assembly is securedly attached to the inlet portion of the fuel storage tank as shown in FIG. 2.

Namely, from the outside is introduced to the inside of the tank through the following clearances and passages, i.e., the air passages 20c defined between the cover 21 and the casing 20, a clearance defined between the cover 21 and the circumferential side portion 23c of the needle valve supporting member 23, a clearance formed between the portion 21c of the cover 21 and the portion 23a of the needle valve supporting member 23, the opening 28 provided for the portion 23a of the needle valve supporting member 23, a clearance defined between the needle valve supporting member 23 and the diaphragm 25, the through bore 24a of the valve seat holding member 24, the through bore 31a provide for the valve seat 31, the air passages 27b provided on the bottom portion 27c of the coil spring supporting member 27, and the openings 20e provided for the casing 20.

As described previously, when the pressure inside the fuel storage tank 11 remains normal, i.e., remaining above the predetermined pressure, but below the atmospheric pressure, the valve seat holding member 24 is urged substantially upwardly by the spring force of the coil spring 26. Such being the case, the valve seat 31 is in contact with the conical free end portion 22b of the needle valve 22, which is centrally positioned inside the assembly M with the help of the needle valve supporting member 23. The valve arrangement including the needle valve 22 and the seat 31 is in a closed mode, whereby the above described passage of the air flow is interrupted. On the other hand, when the pressure inside the fuel storage tank 33 is lowered below the predetermined pressure described above, for a reason such as an unexpected excessive consumption of the fuel contained in the tank or a considerable difference in temperature between the inside of the tank and the outside of the tank, the valve arrangement is effected to be in an open mode as follows. Namely, the film-like portion 25a of the diaphragm 25 is drawn toward the inside of the tank 33 against the resilient force of the coil spring 26, whereby the valve seat holding member 24 is displaced toward the inside of the tank 33. Such being the case, the valve seat 31 is accordingly out of contact with the periphery of the conical tip portion 22b of the needle valve 22, which has been in contact with the valve seat 31 and thus, the valve arrangement is opened. Air can now be introduced into the inside of the tank 33 and the pressure inside the tank 33 can become normalized again. Soon after the pressure inside the tank 33 is normalized, the diaphragm 25, having been displaced, is returned to its normal state by the spring force of the coil spring 26, whereby the valve arrangement is in the closed mode again.

As is clear from the description in the foregoing, according to the capping assembly of the present invention, since an area of the diaphragm can be made relatively large, the assembly can be adapted to respond to a slightly negative change of pressure, with respect to the predetermined normal pressure, by making the resilient force of the coil spring 26 relatively weak. Furthermore, in addition to the characteristic valve arrangement comprising the needle valve and the valve seat according to the present invention, the area required for an effective seal can be quite small relative to those required for conventional valve arrangements. As a result, the valve arrangement of the present invention has the advantage of rendering quite a characteristic sealing effect, wherein the predetermined resiliency of the coil spring can be made comparatively weak in advance thereby ensuring an effective operation of the valve arrangement.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A capping assembly for use with a fuel tank, said assembly comprising:
   a casing having an open end;
   a cover attached to said casing and covering said open end and having a cavity, said cavity being founded by inner peripheral portions of said casing and said cover;
   a diaphragm fixedly positioned within said cavity and having a central opening;
   said diaphragm being movable in response to a pressure differential between the ambient pressure and the pressure within a fuel tank;
   two chambers, each of said chambers being respectively defined by opposite sides of said diaphragm and the periphery of said cavity;
   a first air passage means for communicating one of said chambers with the ambient;
   a second air passage means for communicating the other of said chambers with the inside of a fuel tank;
   a valve means operatively associated with said diaphragm for selectively communicating said two chambers through said diaphragm opening in response to a movement of said diaphragm whereby the pressure within a fuel tank is substantially equalized with the ambient pressure;
   said valve means including:
      a hollow, substantially cylindrical shaped valve seat holding member axially aligned with said diaphragm central opening and having first and second opposite end portions, the first end portion being attached to said diaphragm;
      an elongated needle valve member positioned within said hollow valve seat holding member and having one end extending slightly out of said valve seat holding member, support means adjacent to said cover, said valve member being attached to said support means, said valve member being axially aligned with the diaphragm central opening and having a cross-sectional shape for substantially filling the cross-sectional area of the hollow valve seat holding member, the other end of said valve member being completely enclosed within said cavity and being conically shaped, said valve seat holding member being slightly spaced from said valve member for being movable relative to said valve member in the direction of the axis of the valve member;
      a substantially annular valve seat attached to the second end portion of said cylindrically shaped valve seat holding member and having a valve opening therethrough axially aligned with said conical free end and being positioned and dimensioned for, when said valve seat is in one position, seating with said conical free end for closing said bore; and
      a spring means operatively associated with said valve seat holding member for biasing said valve seat toward said valve and into said one position and for allowing said valve seat to move away from and thereby unseat with said valve in response to a movement of said diaphragm.

2. A capping assembly as claimed in claim 1, in which said support means comprises a valve supporting member positioned within said cavity and having a central aperture;
   a portion of said valve extending through said central aperture;
   said valve being radially slidable with respect to said central aperture;
   said valve support member being fixedly attached to said cover and the outer peripheral portion of said diaphragm being fixedly attached to said valve support member; and
   said valve support member having at least one opening therethrough for communicating said first air passage means with said diaphragm central opening.

3. A capping assembly as claimed in claim 1, further comprising:
   a spring means support member positioned in said other of said chambers and having at least one hole therethrough for communicating said second air passage means with said valve seat bore, and being fixedly attached to a peripheral portion of said diaphragm; and
   said spring means being positioned between and abutting said spring support member and said valve seat holding member whereby said diaphragm and said valve seat holding member are biased toward said valve.

4. A capping assembly as claimed in claim 1, wherein the axis of said diaphragm central opening is aligned with the central axis of said capping assembly.

5. A capping assembly as claimed in claim 1, further comprising:
   an engaging means attached to said capping assembly for, when said capping assembly is used to cap a fuel tank inlet, removably fixing said capping assembly to a fuel tank inlet.

6. A capping assembly as claimed in claim 1, further comprising:
   a gasket means attached to said capping assembly for contacting a portion of an inlet of a fuel tank and thereby sealing said capping assembly with a fuel tank inlet when said capping assembly is removably fixed thereto.

7. A capping assembly for use with a fuel tank, said assembly comprising:
   a casing having an open end;
   a cover attached to said casing and covering said open end and having a cavity, said cavity being bounded by inner peripheral portions of said casing and said cover;
   a diaphragm positioned within said cavity and having a central opening;
   said diaphragm being movable in response to a pressure differential between the ambient pressure and the pressure within a fuel tank;
   two chambers, each of said chambers being respectively defined by opposite sides of said diaphragm and the periphery of said cavity and communicating with one another through said diaphragm central opening;
   a first air passage means for communicating one of said chambers with the ambient;
   a second air passage means for communicating the other of said chambers with the inside of a fuel tank;
   a valve supporting member fixedly positioned within said cavity;
   a hollow, substantially cylindrical shaped valve seat holding member axially aligned with said diaphragm central opening and having first and second opposite end portions, the first end portion being attached to said diaphragm;
   an elongated needle valve member positioned within said hollow valve seat holding member and having one end extending slightly out of said valve seat holding member and being attached to said supporting member, said valve member being axially aligned with the diaphragm central opening and having a cross-sectional shape for substantially filling the cross-sectional area of the hollow valve seat holding member, the other end of said valve member being completely enclosed within said cavity and being conically shaped, said valve seat holding member being slightly spaced from said valve member for being movable relative to said valve member in the direction of the axis of the valve member;
   a substantially annular valve seat attached to the second end portion of said cylindrically shaped valve seat holding member and having a valve opening therethrough axially aligned with said conical free end and being positioned and dimensioned for, when said valve seat is in one position, seating with said conical free end for closing said bore; and
   spring means operatively associated with said valve seat holding member for biasing said valve seat toward said valve and into said one position and for allowing said valve seat to move away from and thereby unseat with said valve in response to a movement of said diaphragm whereby said two chambers are in communication with one another through said diaphragm central opening.

8. A capping assembly as claimed in claim 7, further comprising:
   an engaging means attached to said capping assembly for, when said capping assembly is used to cap a fuel tank inlet, removably fixing said capping assembly to an inlet of a fuel tank.

9. A capping assembly as claimed in claim 7, further comprising:
   a gasket means attached to said capping assembly for contacting a portion of an inlet of a fuel tank and thereby sealing said capping assembly with a fuel tank inlet when said capping assembly is removably fixed thereto.

10. A capping assembly as claimed in claim 7, wherein the axis of said diaphragm central opening is aligned with the central axis of said capping assembly.

* * * * *